US008785844B2

(12) United States Patent
Niehuis

(10) Patent No.: US 8,785,844 B2
(45) Date of Patent: Jul. 22, 2014

(54) METHOD AND A MASS SPECTROMETER AND USES THEREOF FOR DETECTING IONS OR SUBSEQUENTLY-IONISED NEUTRAL PARTICLES FROM SAMPLES

(75) Inventor: Ewald Niehuis, Senden (DE)

(73) Assignee: ION-TOF Technologies GmbH, Muenster (DE)

( * ) Notice: Subject to any disclaimer, the term of this patent is extended or adjusted under 35 U.S.C. 154(b) by 0 days.

(21) Appl. No.: 13/811,455

(22) PCT Filed: Jul. 28, 2011

(86) PCT No.: PCT/EP2011/003803
§ 371 (c)(1),
(2), (4) Date: Jan. 22, 2013

(87) PCT Pub. No.: WO2012/013354
PCT Pub. Date: Feb. 2, 2012

(65) Prior Publication Data

US 2013/0119249 A1 May 16, 2013

(30) Foreign Application Priority Data

Jul. 30, 2010 (DE) ........................ 10 2010 032 823

(51) Int. Cl.
*H01J 49/00* (2006.01)
*H01J 49/40* (2006.01)
*H01J 49/06* (2006.01)

(52) U.S. Cl.
CPC .......... *H04J 49/0031* (2013.01); *H01J 49/061* (2013.01); *H01J 49/40* (2013.01)
USPC .......... 250/282; 250/281; 250/283; 250/287; 250/288

(58) Field of Classification Search
CPC ....... H01J 49/40; H01J 49/025; H01J 49/061; H01J 49/0031; H01J 49/161; H01J 49/421; H01J 49/164; H01J 49/408
USPC .................................................. 250/281–300
See application file for complete search history.

(56) References Cited

U.S. PATENT DOCUMENTS

| | | | | |
|---|---|---|---|---|
| 5,204,530 | A * | 4/1993 | Chastagner | 250/281 |
| 5,471,059 | A * | 11/1995 | Freedman et al. | 250/299 |
| 5,898,173 | A * | 4/1999 | Franzen | 250/287 |
| 6,300,627 | B1 * | 10/2001 | Koster et al. | 250/287 |
| 6,703,608 | B2 * | 3/2004 | Holle et al. | 250/287 |
| 6,717,131 | B2 * | 4/2004 | Holle et al. | 250/282 |

(Continued)

FOREIGN PATENT DOCUMENTS

| | | | |
|---|---|---|---|
| GB | 2300967 | A | 11/1996 |
| GB | 2403063 | A | 12/2004 |
| GB | 2413006 | A | 10/2006 |
| WO | 2006103448 | A2 | 10/2006 |

*Primary Examiner* — Michael Logie
(74) *Attorney, Agent, or Firm* — Karl F. Milde, Jr.; Eckert Seamans Cherin & Mellott, LLC

(57) ABSTRACT

A method is used in a time-of-flight mass spectrometer for analysis of a first pulsed ion beam, the ions of which are disposed along the pulse direction, separated with respect to their ion masses. The ions of at least one individual predetermined ion mass or of at least one predetermined range of ion masses can be decoupled from the first pulsed ion beam, as at least one decoupled ion beam, and the first ion beam and the at least one decoupled ion beam are analyzed.

29 Claims, 7 Drawing Sheets

(56) References Cited

U.S. PATENT DOCUMENTS

| | | | | |
|---|---|---|---|---|
| 6,723,983 | B2 * | 4/2004 | Holle | 250/287 |
| 6,864,479 | B1 * | 3/2005 | Davis et al. | 250/283 |
| 6,933,497 | B2 * | 8/2005 | Vestal | 250/287 |
| 6,984,821 | B1 * | 1/2006 | Appelhans et al. | 250/294 |
| 7,381,949 | B2 * | 6/2008 | Mauck | 250/298 |
| 7,838,824 | B2 * | 11/2010 | Vestal | 250/287 |
| 8,084,751 | B2 * | 12/2011 | Freedman et al. | 250/397 |
| 2002/0145110 | A1 * | 10/2002 | Holle | 250/287 |
| 2004/0026614 | A1 * | 2/2004 | Bateman et al. | 250/281 |
| 2004/0119012 | A1 * | 6/2004 | Vestal | 250/287 |
| 2005/0040326 | A1 * | 2/2005 | Enke | 250/288 |
| 2006/0108521 | A1 * | 5/2006 | Holle et al. | 250/287 |
| 2007/0034796 | A1 * | 2/2007 | Jones et al. | 250/300 |
| 2007/0187585 | A1 * | 8/2007 | Verentchikov | 250/287 |
| 2008/0156978 | A1 * | 7/2008 | Shvartsburg et al. | 250/282 |
| 2009/0101813 | A1 * | 4/2009 | Holle | 250/287 |
| 2009/0114809 | A1 * | 5/2009 | Hotchkis et al. | 250/282 |
| 2010/0229263 | A1 * | 9/2010 | Vertes et al. | 850/9 |
| 2011/0186727 | A1 * | 8/2011 | Loboda | 250/282 |

* cited by examiner a) Attenuation switched off in the analyser for all masses
Current 0.011 pA b) $^{16}O$ attenuated in the HDR analyser
Mass range scaled up at $^{16}O$ with the factor 106
Current 0.919 pA

METHOD AND A MASS SPECTROMETER AND USES THEREOF FOR DETECTING IONS OR SUBSEQUENTLY-IONISED NEUTRAL PARTICLES FROM SAMPLES

BACKGROUND OF THE INVENTION

The present invention relates to a method and to a mass spectrometer and uses thereof for detecting ions or subsequently-ionised neutral particles from samples.

Methods and mass spectrometers of this type are required in particular for determining the chemical composition of solid, liquid and/or gaseous samples.

Mass spectrometers have a wide application in determining the chemical composition of solid, liquid and gaseous samples. Both chemical elements and compounds and also mixtures of elements and compounds can be detected via determination of the mass-to-charge ratio (m/q), subsequently termed "mass" for simplification. A mass spectrometer consists of an ion source, a mass analyzer and an ion detector. There are various types of mass analysers, amongst those inter alia are time-of-flight mass spectrometers, quadruple mass spectrometers, magnetic sector field mass spectrometers, ion trap mass spectrometers and also combinations of these types of equipment. The ion production is effected according to the type of sample to be analyzed via a large number of methods which cannot be listed here completely. Thus there is used for the ionisation in the gas phase, e.g. electron-impact ionization (EI), chemical ionisation (CI) or ionisation by a plasma (ICP); for liquids, there are used inter alia electrospray ionisation (ESI), for solids inter alia, desorption methods, such as laser desorption (LD, MALDI), desorption by atomic primary ions or cluster ions (SIMS) and field desorption (FD). Desorbed neutral particles can be subsequently ionised by electrons, photons or by a plasma and thereafter analyzed by a mass spectrometer (SNMS).

FIG. 1 shows a time-of-flight mass spectrometer of this type having an ion source 1, a time-of-flight analyzer 2, a detector/signal amplifier 3 and an electronic recording unit 4. The time-of-flight analyzer 2 is passed through by an ion beam 11 in which ions m1, m2 and m3 of different masses pass through at intervals.

In this time-of-flight mass spectrometer, the ions 11' 11", 11'" are extracted from the ion source 1 and then generally accelerated to the same energy. Subsequently the flight time of the ions in the time-of-flight analyzer 2 is measured with a defined flight distance. The starting time is established by a suitable pulsing of the ion source itself or by a pulsed input into the time-of-flight analyzer 2. The arrival time of the ions is measured by a fast ion detector with signal amplification 3 and a fast electronic recording unit 4.

The flight time in the time-of-flight spectrometer is proportional to the root of the mass in the case of the same ion energy. By means of suitable ion-optical elements, such as ion mirrors (reflectron) or electrostatic sector fields, different starting energies or starting positions of the ions with respect to the time-of-flight can be compensated for so that the time-of-flight measurement enables a high mass resolution (separation of ions with a very low mass difference) and high mass precision. The essential advantages of the time-of-flight spectrometer relative to other mass spectrometers reside in the parallel detection of all masses which are extracted from the ion sources and an extremely high mass range. The highest still detectable mass is produced from the maximum flight time which the electronic recording unit detects.

The relative intensity of the different masses in a single measurement can be determined from the level of the pulse response of the fast ion detector. However, generally it is not the result of a single flight time measurement which is evaluated but rather the events are integrated over a large number of cycles in order to increase the dynamics and the accuracy of the intensity determination. According to the dimensioning of the time-of-flight spectrometer and the highest mass to be recorded, the maximum frequency of these cycles is a few kHz to a few 10 kHz. Thus, for example at an ion energy of 2 keV, a typical flight distance of 2 m and a frequency of 10 kHz, a maximum mass of approx. 960 u is produced. Doubling the frequency reduces the mass range by the factor 4 to approx. 240 u.

A high mass resolution M/ΔM of 10,000 requires not only a suitable geometry of the analyzer for energy- and space focusing. It can only be achieved if the ion detector and the electronic recording unit enable a very high time resolution in the range of 1-5 as ($M/\Delta M=0.5\times t/\Delta t$). In particular with very low masses M with a relatively short time-of-flight t, the time resolution Δt should be better than 1 ns.

The ion detector should, for a high sensitivity, enable detection of single ions. For this purpose, the ions are converted into electrons by ion-induced electron emission on a suitable detector surface, and the electron signal is amplified by means of fast electron multipliers by typically 6-7 orders of magnitude. For potential separation, also arrangements are used in part, which convert the electrons by means of a fast scintillator into photons and then subsequently amplify the photon signal by means of a fast photomultiplier. The produced pulses are then evaluated with a fast electronic recording unit and the arrival times of the ions are determined with a precision of 1 ns up to a few 100 ps. For this purposes, the amplification in the ion detector must be effected such that the output pulses have as short a pulse duration as possible and such that flight time variations in the amplification process are minimized. In time-of-flight mass spectrometry, micro channel plates (MCP) are therefore used very frequently and are distinguished by a planar detector surface and a particularly fast pulse response with pulse widths in the range of 1 ns. Since the amplification of a single MCP generally does not suffice, arrangements of typically 2 MCPs in succession or of one MCP with scintillator and photomultiplier are used in order to achieve a total amplification of $10^6$ to $10^7$. In addition, also other types of electron multipliers, e.g. with discrete dynodes, are in use.

The dynamic range is of great importance for the use of mass spectrometers. The ratio of the highest signal to the smallest signal which can be recorded is herewith described. In the case of too high signals, the intensity is not measured correctly (saturation limit) as a result of saturation effects of the detector or of the recording. In the case of too low signals, the signal cannot be separated from noise or from the background. The dynamic range of a time-of-flight spectrometer is determined essentially by the detector and by the recording method. If the dynamic range is very small, then the intensity extracted from the pulsed ion source must be adapted very precisely to the dynamic range. The maximum intensity should still be below the saturation limit. The dynamic range then directly determines the detection limit of the time-of-flight mass spectrometer. Within the dynamic range, the measurement of the intensities should be as precise as possible in order that relative intensities, such as isotopic distributions and relative concentrations, can be determined correctly.

A type of recording which is used very frequently in time-of-flight mass spectrometers is based on a single particle counting technique with time-to-digital converters (TDC). The detector delivers for each detected ion an output pulse above a discriminator threshold and the precise arrival time is determined from the pulse response of the detector, e.g. according to the constant-fraction principle. With this technique, the time-of-flight can be measured with a very high time resolution of approx. 100 ps. Immediately after detection of an ion, a dead time of a few as to a few 10 ns results. Within this dead time, no further ions can be detected. This type of recording is therefore suitable only for relatively low counting rates. By means of accumulation of the single article events over a large number of cycles, a histogram of the arrival times can be produced, which provides the intensities of the different masses with sufficient dynamics. In the case of a frequency of 10 kHz, approx. $10^5$ ions in the most intensive mass line (peak) can be recorded thus in 100 s ($10^6$ cycles). In the case of a frequency of 10% for detection of an ion in the highest peak, the probability of a second ion arriving within the dead time of the recording is still relatively low in the range of a few %. At higher counting rates, the probability of multiple ion events increases however significantly. Since the recording records respectively only one single event even in the case of multiple ion events, too few ions are counted in the relevant peak (saturation). This leads to significantly falsified relative peak in densities. These saturation effects due to the occurrence of multiple ion events can be reduced by application of a statistical correction, subsequently termed Poisson correction (T. Stephen, J. Zehnpfenning and A. Benninghoven, J. Vac. Sci. Technol. A 1994, 12, p. 405). Sufficient measuring accuracy for the most intensive peak can be achieved by the Poisson correction up to a frequency of approx. 80%. This corresponds approximately to an average number of entering ions of approx. 1.6. The statistical measuring error is then approx. 0.12% in the case of $10^6$ cycles.

Higher counting rates than approx. one ion per mass and cycle can generally not be measured with sufficient accuracy in the single particle counting technique, even when using the Poisson correction. This saturation limit determines the maximum possible dynamic range of time-of-flight mass spectrometers for a specific frequency and measuring time. The dynamics in this type of operation can only be improved by increasing the number of cycles with a corresponding accompanying extension of the measuring time.

The counting rates can be increased if a plurality of ions per cycle and mass line can be recorded at the same time. A series of techniques has been developed here, which can be explained subsequently only in part. A description of some techniques is found for example in U.S. Pat. No. 7,265,346 B2.

A plurality of independent detectors in the single particle counting technique with TDC recording can thus be connected in parallel. In the case of homogeneous illumination of all detectors, each detector can detect at most one ion per cycle. The technical complexity hence increases significantly with the number of detectors so that typically only a small number of detectors is used in parallel. The dynamic range is hence typically increased by less than a factor of 10. The different detectors can be equipped both with the same and with a different detector surface.

As an alternative to using a plurality of parallel detectors, recordings can also be used which measure the pulse amplitude of the ion detector and determine the number of simultaneously arriving ions from the pulse amplitude. For this purpose, fast analogue-to-digital converters (ADC) which have a high sampling rate and bandwidths in the GHz range are used. Typically, the dynamics at the respective bandwidth up to some GHz are approx. 8-10 bit. The pulse response of a typical ion detector with MCP for a single ion has generally however a relatively wide pulse height distribution. Since a sufficiently high proportion of the single particle pulses must be still significantly above the noise level of the ADC (lowest bit) in order to ensure a high detection probability, a significant fraction of the dynamic range of the ADC is already used even for a relatively low number of ions. The detector amplification must be chosen very carefully in order to avoid saturation of the ADC and at the same time to keep the discrimination of low peak intensities (single ions) low. In order to suppress the noise of the ADC (lowest bit), a suitable threshold is defined and the signals below this threshold are not taken into account during the integration of the data over a large number of shots. This suppression of a part of the single ions leads to non-linearity of the recording in the transition range from the single ion detection to multiple ion detection. In fact, in the case of careful calibration of detector and recording, corresponding corrections of the intensities can be implemented. However, high accuracy of the intensity measurement can be achieved only with great difficulty with such an arrangement. The measurement of large intensity ratios with an accuracy of better than 1% is hence impossible.

The dynamic range can be increased by the parallel use of two ADCs with a different amplitude measuring range. In the case of saturation of the ADC which records the single ions and the low intensities, the high signals are detected with a second ADC. Both measuring results must then be combined suitably to form one spectrum. The dynamics can then be increased up to approx. 12 bit. In this way, up to a few hundred ions per cycle on one mass can be detected. Since these high intensities can however result in saturation effects in the MCPs, the accuracy of the intensity measurement when using fast MCP detectors is not very high. The output current of the MCPs, in the case of sufficiently high amplification, is no longer sufficiently proportional to the input current. Furthermore, the lifespan of the MCP detector is significantly reduced in the case of these high counting rates and the amplification reduces with the number of detected ions. A further disadvantage of the ADC solution resides in the reduced time resolution of detector and ADC in comparison with conventional TDC recording. Furthermore, an extremely high processing speed of the data is required when using ABCs in the GHz range and with shot frequencies of approx. 10 kHz. The technical complexity with these recording systems is therefore very high.

In the case of a large number of applications of time-of-flight mass spectrometry, intensities of different masses with very high dynamics and very high accuracy must be measured.

This applies for example to the measurement of isotopic ratios for elements with greatly differing isotopic abundances. Thus, for example the relative frequency of the isotopes of oxygen $^{16}O/^{18}O$ is approx. 487. If the single particle counting technique with TDC recording is used and if the signal is corrected by means of the Poisson correction, then at most approx. $1\times10^6$ ions of the type $^{16}O$ can be recorded in $10^6$ cycles. The intensity of the main isotope must be correspondingly optimized for this purpose. The simultaneously measured intensity of the isotope $^{18}O$ is then only approx. 2,055 ions. Hence, the statistical error for $^{18}O$ is still at 2.2%. In order to reduce the statistical error to approx. 0.1%, the number of cycles must be increased by a factor 500 to $5\times10^8$. In the case of the typical frequencies of 10 kHz, a measuring time of approx. 14 hours is calculated for a statistical accuracy of 0.1%. Long measuring times of approx. 10 hours are likewise produced in the determination of other important isotopic ratios, such as e.g. of $^{238}U/^{235}U$, $^{14}N/^{15}N$, $^{12}C/^{13}C$ with high statistical accuracy.

A similar problem is shown also in the detection of traces in the ppm or ppb range. The intensities of the mass lines of the main components should still be below the saturation limit of the single particle counting technique (approx. 1 ion per cycle when using the Poisson correction), While, for the low concentrations, sufficient signal for a still adequate statistical accuracy must be accumulated. For a statistical accuracy of 1% with a detection limit of 1 ppm, approx. $10^{10}$ cycles are then required and hence measuring times of approx. 50 hours (a frequency of 20 kHz being assumed). The detection off 10 ppb with approx. 10% statistical accuracy requires approx. a comparable number of measuring cycles.

In other important types of operation, only very short measuring times are often available for the intensity determination. Thus, frequently temporally variable intensities with a time resolution in the range of a few seconds must be measured. Correspondingly, the number of measuring cycles for this time interval is still only approx. $10^5$. The dynamics in the mass spectrum for this time interval is therefore reduced to approx. 4-5 orders of magnitude. The detection limit with a measuring time of 10 s is therefore, even in the case of optimum adaptation of the intensity of the main components, well above 1 ppm. A statistical accuracy of approx. 10% is given only above 1,000 ppm.

In the case of mass spectrometers for measuring distribution maps, generally the intensities must be measured for a large number of pixels. In the case of a relatively long measuring time of 1 hour, 256×256 pixels and a frequency of 20 kHz, only 1,100 measuring cycles per pixel are hence accumulated. The simultaneous measurement of distribution images for isotopes with a very different isotopic abundance, such as e.g. $^{16}O/^{18}O$, is hence impossible in the single particle counting technique. The same applies for the measurement of distribution maps of masses with very different concentrations.

SUMMARY OF THE INVENTION

In order to alleviate or remedy the problems described in prior art, it is the object of the present invention to make available a method for operating a time-of-flight mass spectrometer and also a time-of-flight mass spectrometer and uses thereof, with which the dynamic range of the measurement can be improved in the case of very high accuracy, in particular in the case of temporally varying intensities, for detecting traces in the ppm or ppb range, in the measurement of distribution maps. The method according to the invention and the mass spectrometer according to the invention are intended furthermore to have a high time resolution, in particular when recording with TDC in the single particle counting technique. Furthermore, the life span of the ion detectors which are used is intended to be improved, the loading thereof with high intensities reduced and in total the technical complexity and the costs of the method according to the invention or of the mass spectrometer are intended to be reduced or kept low.

The method according to the invention for operating a time-of-flight mass spectrometer is used for analysis of a first pulsed ion beam, the ions of which are disposed along the pulse direction, separated with respect to their ion mass. Such a separation of ions of individual ion masses is effected, as described above, such that firstly the ions are extracted from an ion source and then accelerated generally to the same energy. As a function of the mass, a different speed is produced, as a result of which the ions are separated from each other with respect to their mass inside the ion pulse.

According to the invention, ions of at least one individual predetermined ion mass or at least one predetermined range of ion masses are now decoupled from such an ion pulse. This decoupled ion beam is subsequently analyzed just as the original ion beam.

It is possible here to analyze the intensity of the decoupled ion beam or the intensity of the original ion beam with detectors of different sensitivity. Consequently, it is possible to analyze, for example in the first ion beam, merely ions of weak-intensity mass ranges or masses with a detector of high sensitivity and to decouple the ions of strong-intensity mass ranges or masses from the first ion beam and to analyze them with a detector with low sensitivity. Conversely, of course also the ions of weak-intensity mass ranges or masses can be decoupled from the first ion beam so that the first ion beam is measured with a detector of low sensitivity and the decoupled ions with a detector of high sensitivity.

A further possibility is produced as a result of the fact that the beam which contains the strong-intensity mass regions or masses is attenuated by means of a filter or another suitable device and possibly the decoupled ions are subsequently reunited again with the original ion beam. Reuniting the ion beams here means both combining to form a beam in front of a detector so that the reunited beam impinges on the detector or also that the individual beams are directed towards the same detector and thus the detector detects merely one-reunited-ion beam.

Not only the ions of one mass range or one mass can be decoupled, rather it is also possible to decouple ions of a plurality of ranges or a plurality of masses. This can be effected by a single beam switch which is suitably pulsed or even by a plurality of beam switches. It is also possible to use a pulsed beam switch which can deflect in different directions so that the ions of different masses or different mass ranges are deflected in different directions by this beam switch.

If different decoupled ion beams are produced, then these can be analyzed partially or completely by suitable detectors of suitable sensitivity or even be reunited again partially or completely with the original ion beam and analyzed with the same detector.

When combining individual ion beams, care must be taken that the ions of different masses in the common beam which is produced are disposed or move also separated from each other again. It is thereby advantageous, but not absolutely necessary, if the ions of the decoupled ion beam which are reunited again with the first ion beam are inserted into the first ion beam at the corresponding position which corresponds to their mass. They can also be added at other positions, for example at the beginning or at the end of the first ion beam pulse. However it is common to insert the ions again corresponding to their mass in the first pulsed ion beam.

At the spectrometer entry, the separation of the original ion beam into various ion beams which comprise ions of different masses can be effected not only constantly via a measuring cycle but can also be continually changed/controlled. For this purpose, it is possible for example at the beginning of a measurement to measure several ion beam pulses and to determine those masses at which the intensity of the ions to be analyzed exceeds a boundary value. Subsequently, these ions can be decoupled via a pulsed switch or the like. If the intensity of these decoupled ions drops again below the boundary value, then the decoupling can be cancelled again. Correspondingly, ions of other masses or mass ranges can be decoupled as soon as their intensity exceeds a predetermined boundary value during the measurement.

Examining the intensity can thereby be effected at the beginning of a measurement, continuously at regular and/or irregular intervals or merely occasionally.

The method according to the invention can be used particularly advantageously if the analysis of the ions is effected by means of the single particle counting technique, in particular by means of time-digital converters (time-to-digital converter, TDC converter). In particular the use of analogue-digital converters (A-D converter) is suitable for multiples particle recording.

The time-of-flight mass spectrometer according to the invention has therefore according to the invention at least one beam switch which is suitable for deflecting ions of at least one specific mass or at least one specific mass range from a first pulsed ion beam. Furthermore, the time-of-flight mass spectrometer, in a first variant, has a first detector for analysis of the first ion beam and at least one further detector for analysis of the decoupled ions. The further detector can thereby have a different sensitivity from the first detector, for example less sensitivity for analysis of masses or mass ranges in which ions with high intensity are to be detected or also high sensitivity for analysis of masses or mass ranges in which ions of low intensity are to be detected.

In a further variant, the time-of-flight mass spectrometer has at least one device with which the intensity of the ions of one mass or one mass range can be attenuated. There are suitable as a device of this type for the attenuation, gratings, screens, ion-optical elements, for example voltage-controlled ion-optical elements, such as electrostatic lenses, filters, in particular those filters, the attenuation of which can be adjusted by mechanical or electrical elements. Also possible are modifications of a Bradbury-Nielson shutter in which only partial ranges are deflected and other ranges are allowed through without deflection. In this variant, a device can be provided furthermore in order to reunite again the decoupled and possibly attenuated ion beam with the first ion beam.

Also combinations of both above-described variants are possible, different decoupled ion beams being analyzed differently, for example by means of a separate detector or after attenuation and being reunited with the first ion beam.

It is also conceivable that two different decoupled ion beams of different masses or mass ranges are reunited after attenuation of one of the decoupled ion beams and are detected with a separate detector.

If is possible by means of the present invention to avoid saturation of the detectors in a high dynamic range of intensities of a pulsed ion beam, either by using different detectors of different sensitivity and/or by reducing/attenuating the intensity of the ions in those mass ranges or those masses in which a single particle counting technique would no longer be possible without attenuation.

The boundary value is thereby approximately at 1 ion/ion beam pulse since, above one ion per pulse, multiple particle events occur within the dead time and thus no exact counting of the ions of this mass or of this mass range is possible in the single particle counting technique even when using the Poisson correction.

The method according to the invention enables high accuracy and linearity of the measurement with simultaneously high time resolution and low technical complexity. In particular, a single particle counting technique with TDC recording can be applied.

Thus the present invention makes it possible to detect, for example intensities up to 100 ions per ion pulse within one mass range or at one determined mass, still quantitatively in the single particle counting technique by reducing the intensity of this mass line to an intensity$\leq$1 ion/ion pulse. The present invention also makes possible a variable attenuation of such mass lines during one measuring cycle, the beam switch being pulsed in such a manner that only the masses with high intensity are deflected and reduced in intensity or analyzed separately and all remaining masses are allowed through without deflection to the corresponding detector. Such a spectrum recorded in the single particle counting technique then comprises mass lines without attenuation and mass lines with attenuation after it has been assembled from the individual analysis results. It is thereby known from the temporal actuation of the pulsed beam switch for which time window in the time-of-flight mass spectrometer and hence for which masses the attenuation was activated. The intensities of these mass lines can therefore be multiplied in order to produce a correct spectrum corresponding to the attenuation factor, for example a factor 100, in order to reconstruct the actual intensity of the corresponding ions of the corresponding mass or of the corresponding mass range.

The invention can be structured such that additional trajectories with different attenuation factors are used. Thus for example the beam switch can undertake a deflection in two different directions and, in the case of the two resulting trajectories, filters with two different attenuation factors can be used. By means of the deflection direction, a suitable attenuation factor can then be chosen for each mass line with an intensity above the single particle counting limit. The dynamic range can hence be increased even further. Thus extremely intensive masses with e.g. 1,000 ions per cycle could be detected still by an attenuation by the factor 1,000 in the single particle counting technique and, with the second filter unit, average intensities could be reduced by a factor $\sqrt{1{,}000}\approx 32$. By using these two different filters, intensity measurements can be implemented with great accuracy over a large dynamic range.

Development of the concept by additional attenuation factors is likewise possible within the scope of this invention. The attenuation can be chosen very differently according to the type of application of the time-of-flight mass spectrometer. Also extremely large attenuation factors are conceivable in order to be able to record also simultaneously extremely intensive mass lines. This is sensible for example for mass spectrometry methods with extreme demands on the dynamic range of up to 10 orders of magnitude, such as e.g. in ICP-MS.

Beyond extending the dynamic range with high linearity and time resolution, the invention also increases the lifespan of the detector. Due to the attenuation of the intensive mass lines to single ions, the loading and wear and tear on the detector is comparable to normal operation in the single particle counting technique.

Furthermore, the invention reduces the technical complexity of the recording in comparison with solutions with ADC or a plurality of ADCs or arrangements with a plurality of detectors in the single particle counting technique. The economical, conventional solution with TDC in the single particle counting technique can be used furthermore. Merely the pulsed beam switch is required in addition.

The choice of mass ranges which are above the limit for the single particle counting technique can be effected manually. For this purpose, firstly a very short spectrum recording must be effected over several 100 cycles. The measuring time is correspondingly less than 0.1 s. Thereafter, the mass ranges which are above approx. 0.7 to 0.8 ions per cycle can be selected according to the invention for the attenuation. Should the arrangement enable a plurality of attenuation factors, the smallest attenuation for the selected mass ranges should be chosen firstly. Thereafter, it can be established by a further, short-term spectrum recording which masses require an even higher attenuation in order to be able to be recorded in the single particle counting technique.

The choice of mass lines which are above the limit for the single particle counting technique can be effected also correspondingly automatically. As soon as the intensity of a mass line exceeds the single particle counting limit, the corresponding range is directed by the beam switch through the filter. If the counting rate drops again in the farther course below the level of (0.7/attenuation factor), then the filtering for this mass line can be cancelled.

The invention can also be modified such that, after the beam switch and filtering, both beam paths remain separated furthermore and a separate detector is used for each beam path. In this case also, the different detectors can be operated in the single particle counting technique. The data can be assembled subsequently again to form one spectrum. One advantage of this variant resides in the fact that the back deflection of the beam after the filtering can be dispensed with. The technical complexity is however somewhat increased by the second detector.

The invention can also be used during recordings with ADCs. The dynamic range of the ADC is relatively limited. In the case of extremely high intensities, the detector no longer operates in the linear range, i.e. the output current is no longer proportional to the intensity at the input. By the attenuation of the intensities above the linear range, these can foe reunited again into the linear range. By attenuation of the most intensive mass lines, the intensities can then be reduced, according to the invention, so far that these are again in the recording range of the ADC. Since the mass ranges for which the attenuation has been activated are known, the resulting spectrum can subsequently be reconstructed again by multiplying these ranges by the attenuation factor.

For a full understanding of the present invention, reference should now be made to the following detailed description of the preferred embodiments of the invention as illustrated in the accompanying drawings.

DESCRIPTION OF THE PREFERRED EMBODIMENTS

The reference numbers used in the individual Figures are used in the same or corresponding manner for the same or corresponding elements in all the Figures. Their description is therefore extensively omitted after the first description.

The examples subsequently described of the present, invention describe respectively individual aspects of the invention or several such aspects which can however be used not only in the combination represented in the respective example but also in another combination or separately from each other. The following examples therefore describe merely a few embodiments of the present invention.

Figure 2:
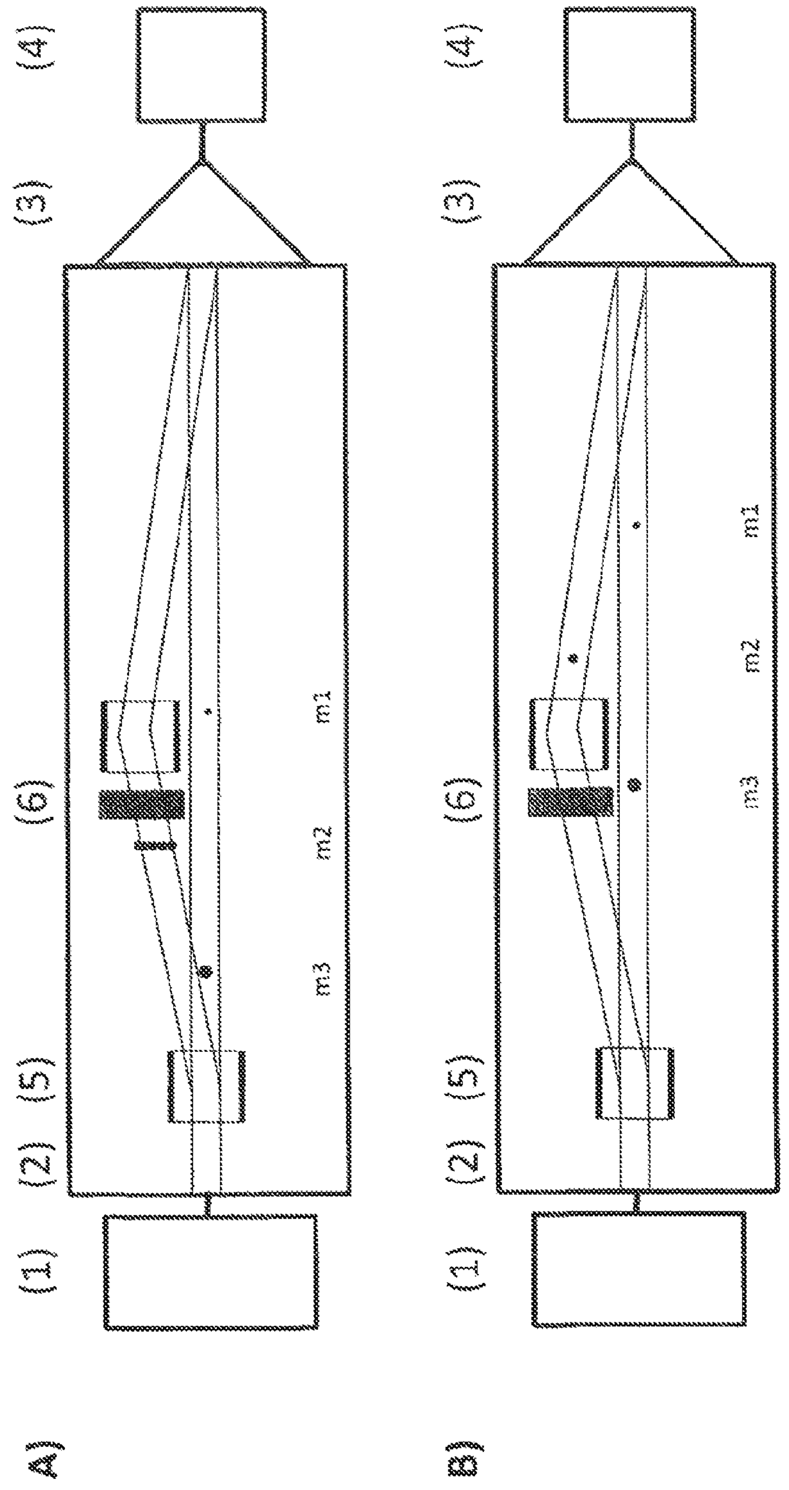
FIG. 2 is a diagram of a time-of-flight mass spectrometer with a beam switch and filter at times $t_1$ (FIG. 2A) and $t_2$ (FIG. 2B) according to the present invention.

FIG. 2 now shows, in the partial Figures A and B, a mass spectrometer according to the present invention at various times $t_1$ and $t_2$.

Figure 1:
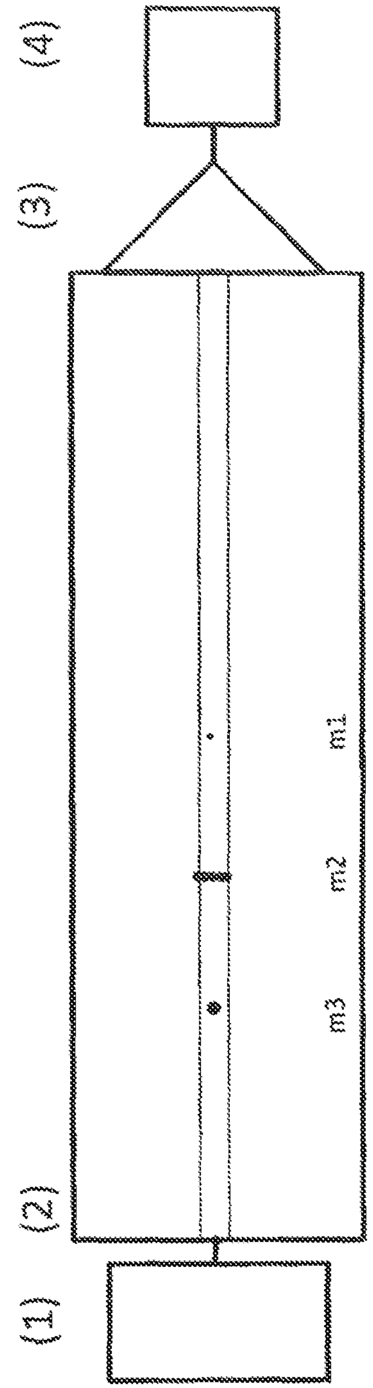
FIG. 1 is a diagram of a time-of-flight mass spectrometer according to the state of the art.

In FIG. 2A, the spectrometer, just as the spectrometer of FIG. 1 from the state of the art, has an ion source 1, a time-of-flight analyzer 2, a detector and a signal amplifier 3 and an electronic recording unit 4. Compared with the state of the art, there is disposed in addition in the time-of-flight analyser 2 a beam switch 5 which decouples an ion beam 10' from the original first ion beam 10. The original ion beam 10 thereby comprises the ions 11' and 11''' which are weak-intensity (characterized merely with a dot, not to scale), while the ions 11" of a different mass which are very strong-intensity (five dots, not to scale) are decoupled into the ion beam 10'.

In the time-of-flight analyser 2, a filter 6 is now disposed in the path of the ion beam 10' for attenuation with a corresponding attenuation factor. Following this is a device for coupling the decoupled ion beam 10' into the first original ion beam 10, this device being designated with the reference number 7 and deflecting the ion beam suitably towards the detector/signal amplifier 3 disposed at the end of the time-of-flight analyser.

FIG. 2B now shows the same mass spectrometer at a later time $t_2$, at which the ions 11" of the strong-intensity mass ran through the filter 6 and through the deflection device 7. The intensity of the ions 11" is now reduced (another dot illustrated merely schematically) and is then added again to the ion beam 10. Hence the intensity of the ions 11" is attenuated in such a manner that it can be detected by the detector 3 inside the proportional range.

Figure 3:
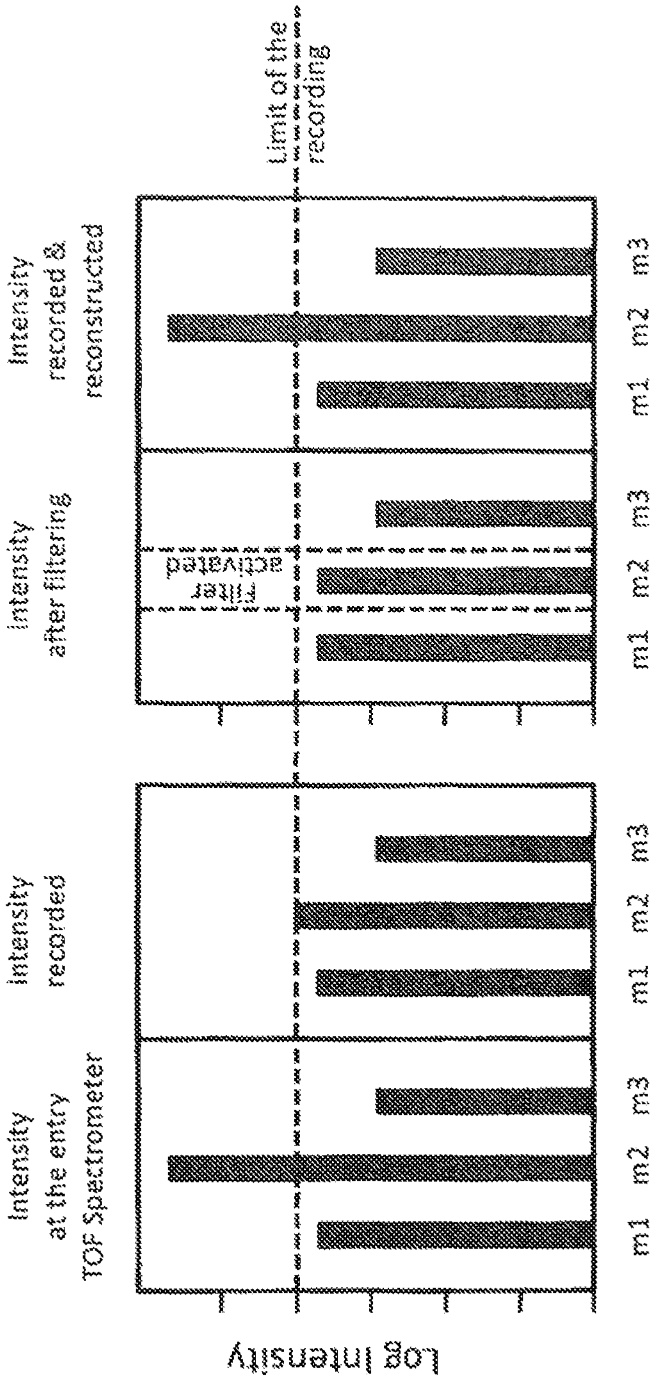
FIG. 3 shows representational diagrams of spectra of a TOF spectrometer, as are obtained at different intensities at the entry of the spectrometer, with the left diagram representing the recorded intensities according to the state of the art and the right diagram representing the recorded and reconstructed intensities according to the present invention.

FIG. 3 now represents the corresponding measuring results schematically.

With the masses m1, m2, m3, the ions described in FIG. 2 with the reference numbers 11''', 11", and 11' are represented.

While the intensity at the entry of the spectrometer or of the time-of-flight analyser 2 is represented on the left in FIG. 3A, the recorded intensify when using a conventional time-of-flight, spectrometer in FIG. 3A is represented on the right side. It can be detected that the strong-intensity mass m2, the initial intensity of which is above the proportional range of the detector (boundary value of the recording), is detected merely up to the recording limit and therefore the spectrum is falsified.

In FIG. 3B, it is represented on the left that the intensity of the line with the mass m2 is reduced by the filtering with the filter 6 of the spectrometer represented in FIG. 2 to below the boundary value of the recording so that this intensity, even if attenuated, is also correctly recorded. Subsequently, the intensity which was present at the entry of the time-of-flight analyser 2 can be numerically reconstructed by multiplication of the recorded intensity by the attenuation factor. The correct line spectrum which is represented on the right in FIG. 3B is then produced.

While an attenuation factor is represented merely schematically in FIG. 2, an attenuation factor of 100 has been used in FIG. 3 for explanation. The logarithmic scale of the ordinates may be noted.

Figure 4:
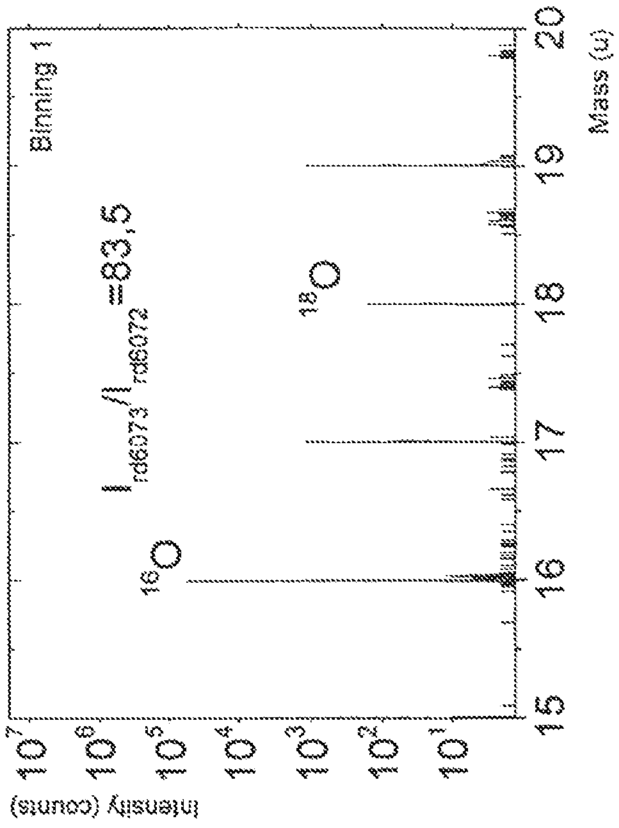
FIGS. 4A and 4B are extracts from TOF-SIMS spectra of a solid surface, FIG. 4A showing a spectrum with low primary ion current in the single particle counting technique according to the state of the art and FIG. 4B a spectrum with increased primary ion current with attenuation of the intensity of the ions of the mass 16 and subsequent reconstruction according to the invention.
Figure 4:
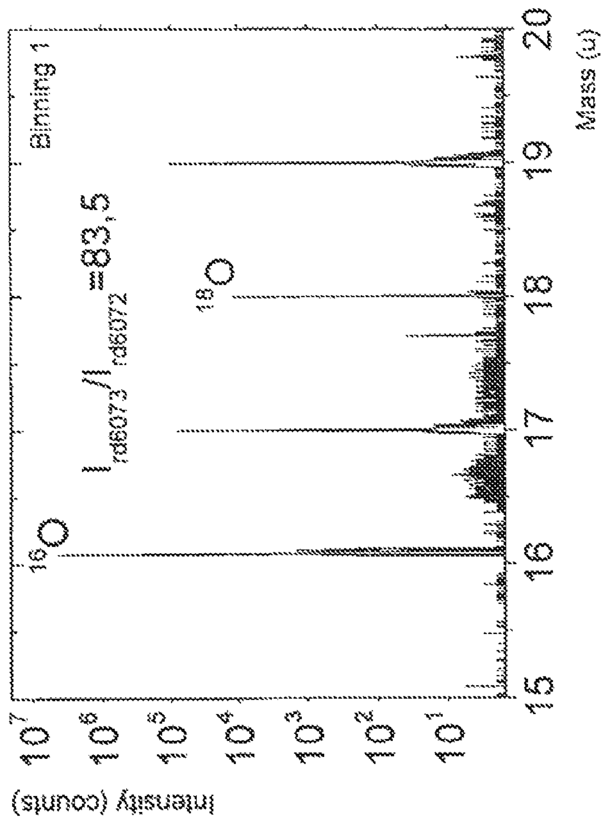

FIG. 4 shows cut-outs from actually measured TOF-SIMS spectra of a solid surface. FIG. 4A thereby shows a spectrum with a low primary ion current in the single particle counting technique without attenuation. FIG. 4B shows a spectrum in which the primary ion current was increased, the intensity of the mass 16, as described in FIG. 2, having been attenuated. Finally, the output intensity for the attenuated signals with the mass 16 was reconstructed again using the attenuation factor 106.

With this example, the advantages of the invention are explained with the example of the measurement of the isotopic ratio $^{16}O/^{18}O$ in a time-of-flight secondary ion mass spectrometer (TOF-SIMS). SIMS is suitable in particular for the isotopic analysis of solids with high lateral resolution in the range of micrometers and below. In TOF-SIMS, secondary ions are desorbed by a short primary ion pulse with a pulse duration of approx. 1 ns from a solid sample, accelerated to the same energy and analyzed with a time-of-flight spectrometer. In the case of a conventional recording in the single particle counting technique, the primary ion intensifies must be chosen such that the intensity of $^{16}O$ is below the saturation limit of the single particle counting technique (approx. 1 ion/cycle). After in total $1.2 \cdot 10^{16}$ cycles in a measuring time of 2 min, the intensity of $^{16}O$ in the measurement is approx. 784,000 ions. The intensity of $^{18}O$ is significantly lower because of the natural isotopic abundance and in this example is here 1,650 ions (see FIG. 3A). Hence the statistical measuring error of $^{18}O$ is approx. 2.5%. In order to reduce the statistical error to 0.23%, the measuring time could be increased by a factor 100 to approx 200 min.

According to the invention (see FIG. 2), a pulsed beam switch and a filter with an attenuation factor of 106 were integrated into the TOF-SIMS. If the isotopic ratio $^{16}O/^{18}O$ is measured with this arrangement according to the invention, then the intensity of $^{16}O$ can be chosen such that, without the beam switch, up to 100 ions would reach the detector per shot. For this purpose, the primary ion current can be correspondingly increased. In the example, the current was increased by a factor 83.5 with a resulting intensity for $^{16}O$ of approx. 50 ions per cycle. A recording of this high intensity is no longer possible in the single particle counting technique. After deflection and attenuation of the intensity of the $^{16}O$ ions, e.g. by the factor 106, on average however still only 0.5 ions per cycle are then recorded. The precise intensity can then be calculated in the normal manner by means of the single particle counting technique with possibly subsequent Poisson correction. The isotope $^{18}O$ can be recorded simultaneously without attenuation since on average only approx. 0.1 ions per cycle are detected in the case of natural isotopy.

The beam switch is pulsed for this purpose such that only the mass 16 is deflected and attenuated, whereas all other masses are allowed through without deflection towards the detector 3. After the same measuring time of 2 min, the statistical accuracy of $^{18}O$ then reaches the value of 0.25%. The mass $^{16}O$ then still has an approx. 5 times the intensity and hence a statistical error of 0.012% despite the attenuation by a factor 106. After the multiplication of the intensify of $^{16}O$ by the factor 106, the isotopic ratio can then be measured in this way with high statistical accuracy. The corresponding spectrum is represented in illustration 4*b*. As a result of the invention, the measuring time is thus shortened by the factor of approx. 100 in comparison with the normal single particle counting technique. By extending the measuring time by the factor 6, the statistical error can be reduced to approx. 0.1%. Without the invention, a measuring time of approx. 20 hours would be required in this example for this purpose. While a measuring time of 12 min would be sufficient because of the invention.

In the same way, the measuring time is also shortened by the invention in the case of detection of traces in the ppm to ppb range. The intensities of the main components—as shown in the above example of the mass 16—can be attenuated via the filter and then measured in the single particle counting technique. At the same time, the intensities of trace elements can be measured without attenuation at a high counting rate. Correspondingly, an increase in the dynamic range by a factor 100 with the same measuring time is produced or respectively, with the same dynamics, a reduction in the measuring time by this factor.

In the case of modes of operation with a short measuring time for the intensity determination (e.g. temporally rapidly variable intensities, imaging methods with measurement of the intensity for a large number of pixels), the dynamic range is likewise correspondingly increased by the factor 100 or the measuring time is reduced in the case of the same dynamics.

If e.g. the ratio $^{16}O/^{18}O$ in one imaging method is determined (see above), then only approx. 1,100 cycles per pixel are available in one hour measuring time according to the above example. According to the state of the art, only 2 ions of the mass $^{18}O$ per pixel are thus recorded. If the intensity of the primary ion pulse is chosen according to the invention such that approx. 100 ions per shot are produced for the mass line $^{16}O$ before the attenuation, then the intensity of $^{18}O$ is 0.2 ions per cycle. After 1,100 cycles, approx. 200 ions per pixel are then counted and the distribution of $^{16}O$ and $^{18}O$ can be measured at the same time with a statistical accuracy of approx. 7%.

Figure 5:
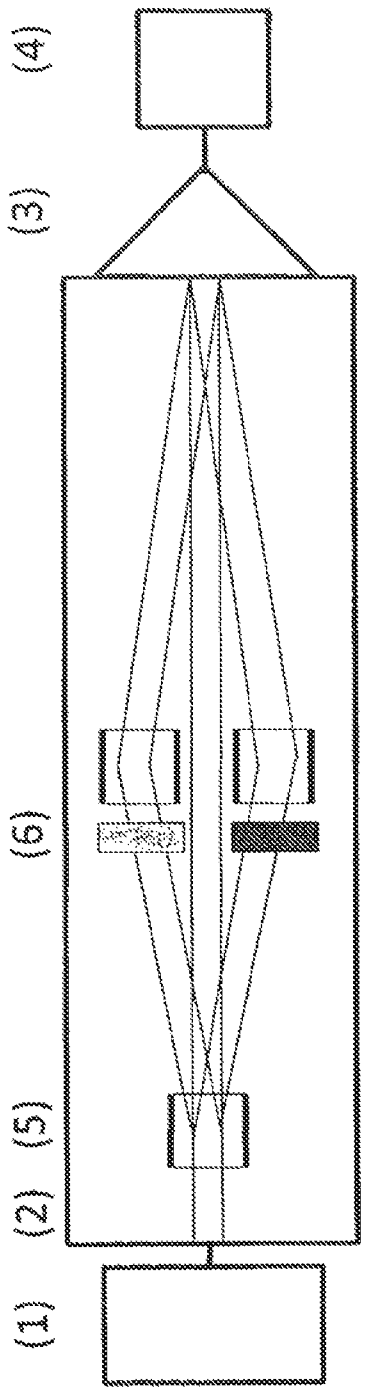
FIG. 5 is as diagram of a further mass spectrometer according to the invention with a plurality of filters.

In FIG. 5, a further mass spectrometer according to the invention is represented schematically. In contrast to the mass spectrometer of FIG. 2, this has a beam switch 5 which can deflect ions of different masses in two different directions as decoupled beams 10' or 10". In the path of the respective beams 10' and 10", filters 6' and 6" are disposed, the attenuation factor of which is adapted to the intensity of the ions of the respective beam 10' or 10". Furthermore, there is situated in each of the beams 10' and 10", a device 7' or 7" for coupling the respective beam 10' or 10" into the original first ion beam 10.

Figure 6:
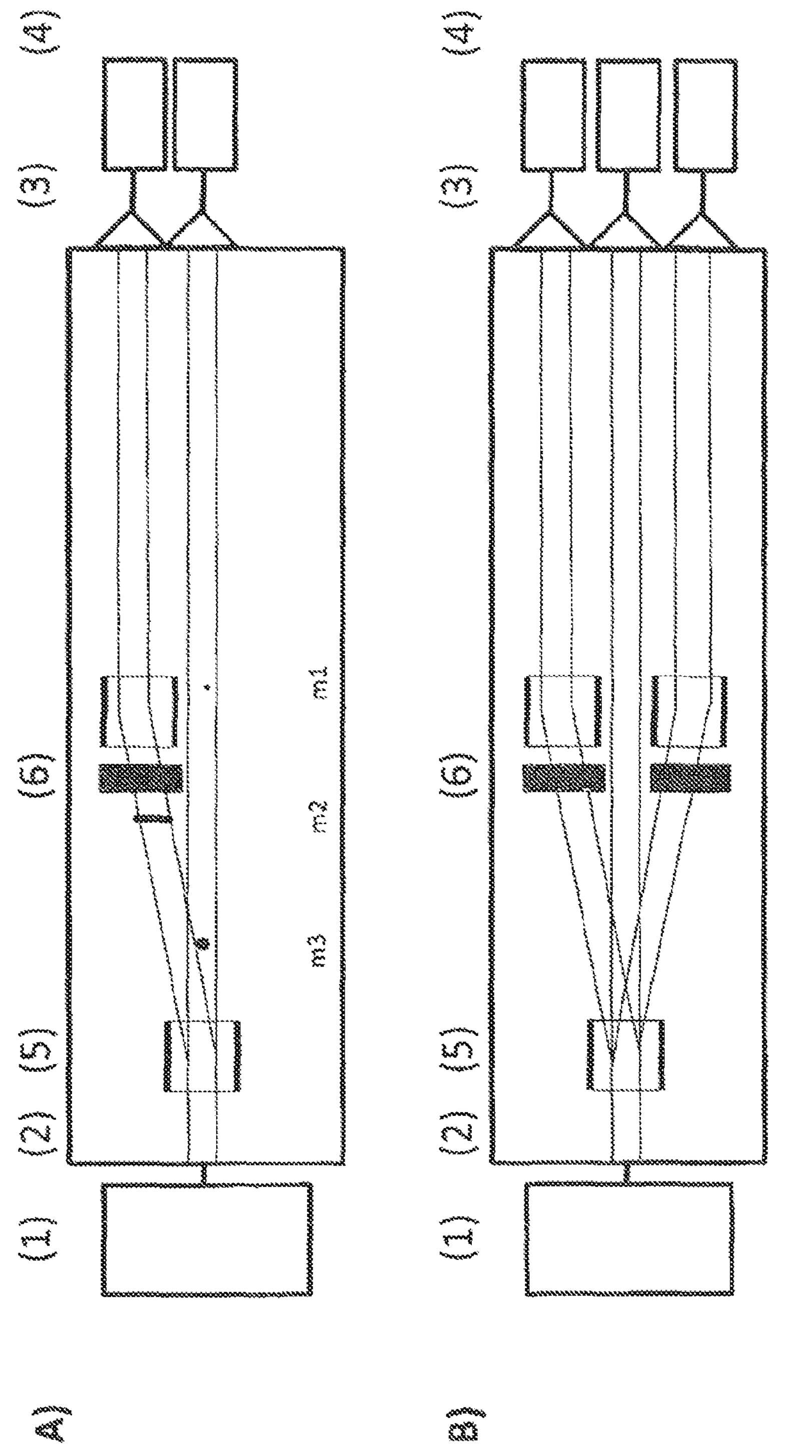
FIGS. 6A and 6B are diagrams of two further mass spectrometers according to the invention, each with a plurality of detectors.

FIG. 6 shows two mass spectrometers in which a plurality of detectors 3, 3', 3" is provided.

In FIG. 6A, a mass spectrometer which corresponds extensively to that in FIG. 2 is represented. However, this spectrometer has no device 7 for coupling the ion beam 10' into the ion beam 10 towards a common detector, but rather a device 8 with which the ion beam 10' is directed towards a separate detector/signal amplifier 3'. A separate electronic recording unit 4' is connected downstream of this detector/signal amplifier 3'. Such a deflection device 3, with suitable positioning of the detectors or suitable beam guidance, can also be dispensed with. After determination of the spectrum of the beam 10' and of the spectrum of the beam 10, the entire mass spectrum is assembled from both analysis results, the attenuation factor of the filter 6' requiring to be taken into account for the beam 10'. Alternatively, the filter 6' can also be omitted and a detector of a lower sensitivity can be used for the beam 10'.

FIG. 6B shows a further embodiment of a spectrometer according to the present invention.

Just as FIG. 6A modified the spectrometer of FIG. 2, the spectrometer of FIG. 6B now modifies the spectrometer of FIG. 5.

Instead of the device for coupling the ion beam 10' or 10" in the original ion beam 10 or for direction to the same detector, now merely deflection devices 8', 8" are provided, which direct, the beams 10' and 10" to separate detectors/ signal amplifiers 3', 3". Separate electronic recording units 4' or 4" are disposed downstream of these detectors 3', 3". After taking into account the filters 6' and 6" which are different, the total spectrum is assembled from the individual spectra of the electronic recording units 4, 4' and 4".

The filters 6' and 6" can also be omitted here provided that detectors 3', 3" for the individual beams 10' and 10" which have a suitable sensitivity are used.

Furthermore, it is possible also to mix these embodiments with an embodiment like that of FIG. 5, for example the deflection device 8', in FIG. 6B, can be replaced by the device 7' of FIG. 5 so that the ion beam 10' impinges, after suitable attenuation, on the detector 3 on which the ion beam 10 impinges in FIG. 6B. For the ion beam 10", the beam guidance and beam detection represented in FIG. 6B can be retained.

There has thus been shown and described a novel method and a mass spectrometer and uses thereof for detecting ions or subsequently-ionised neutral particles from samples which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A method for operating a time-of-flight mass spectrometer for analysis of a first pulsed ion beam, the ions of which are disposed in a separated manner along a pulse direction with respect to their ion masses, wherein ions of at least one individual predetermined ion mass or of at least one predetermined range of ion masses are decoupled from the first pulsed ion beam and form at least one decoupled ion beam, and the first ion beam and the at least one decoupled ion beam are analyzed, wherein the intensity of at least one decoupled ion beam or the intensity of the first ion beam is attenuated after decoupling, and wherein at least one decoupled ion beam, after attenuation of the first ion beam or of the decoupled ion beam, is reunited with the first ion beam.

2. The method according to claim 1, wherein the ions of the decoupled ion beam and of the first ion beam are positioned in the common ion beam, separated with respect to their masses.

3. The method according to claim 2, wherein the ions positioned in the common ion beam are separated corresponding to their mass.

4. The method according to claim 1, wherein at least one decoupled ion beam is analyzed separately from the first ion beam.

5. The method according to claim 4, wherein the first ion beam is analyzed with lower sensitivity than the decoupled ion beam which is analyzed separately from the first ion beam.

6. The method according to claim 4, wherein the decoupled ion beam, which is analyzed separately from the first ion beam, is analyzed with lower sensitivity than the first ion beam.

7. The method according to claim 1, wherein a common mass spectrum, advantageously in portions, is determined from the analysis result with respect to the first ion beam and from the analysis result with respect to the at least one decoupled ion beam.

8. The method according to claim 1, wherein the intensity of the first ion beam is determined as a function of the ion mass for one or more specific individual masses or for one or more specific individual mass ranges and, upon exceeding a boundary value, only the ions of the relevant mass or of the relevant mass range are decoupled from the first ion beam.

9. The method according to claim 8, wherein the boundary value is that intensity of the ion beam at a specific mass or in a specific mass range above which the error, when counting single particles of the relevant mass or of the relevant mass range, exceeds a predetermined error boundary value.

10. The method according to claim 1, wherein the intensity of the first ion beam is determined for one or more specific individual masses or for one or more specific individual mass ranges and, upon falling below a boundary value, the ions of the relevant mass or of the relevant mass range are not or are no longer decoupled from the first ion beam.

11. The method according to claim 10, wherein the intensity of the first ion beam is determined continuously or at regular and/or irregular time intervals.

12. The method according to claim 11, wherein the boundary value is that intensity of the ion beam at a specific mass or in a specific mass range above which the error, when counting single particles of the relevant mass or of the relevant mass range, exceeds a predetermined error boundary value.

13. The method according to claim 10, wherein the boundary value is that intensity of the ion beam at a specific mass or in a specific mass range above which the error, when counting single particles of the relevant mass or of the relevant mass range, exceeds a predetermined error boundary value.

14. The method according to claim 1, wherein, at the beginning of the analysis, the intensity of the first ion beam is determined as a function of the ion mass for one or more specific individual masses or for one or more specific individual mass ranges and, upon exceeding a boundary value, the ions of the relevant mass or of the relevant mass range are decoupled from the first ion beam.

15. The method according to claim 14, wherein the intensity of the first ion beam is determined continuously or at regular and/or irregular time intervals.

16. The method according to claim 14, wherein the boundary value is that intensity of the ion beam at a specific mass or in a specific mass range above which the error, when counting single particles of the relevant mass or of the relevant mass range, exceeds a predetermined error boundary value.

17. The method according to claim 1, wherein the analysis of one, of a plurality, or of all the ion beams is carried out by means of single particle detection.

18. The method according to claim 17, wherein the analysis is carried out by means of time-to-digital converters (TDC converter).

19. The method according to claim 17, wherein the analysis is carried out by means of multi-particle recording.

20. The method according to claim 17, wherein the analysis is carried out by means of analogue-digital converters (ADC).

21. Use of a method according to claim 1, wherein the pulsed ion beam is produced by means of a desorption method selected from the group consisting of field desorption (FD), desorption by atomic primary ions or cluster ions (SIMS) and laser desorption (LD).

22. The method according to claim 21, wherein the pulsed ion beam is produced by matrix-assisted laser desorption (MALDI).

23. Use of a method according to claim 1, wherein the pulsed ion beam is produced by means of a method selected from the group consisting of plasma ionization (ICP), electrospray ionization (ESI), electron-impact ionization (EI), and chemical ionization (CI).

24. The method according to claim 23, wherein the chemical ionization (CI) is carried out with neutral particles desorbed under subsequent ionization.

25. A time-of-flight mass spectrometer for analysis of a first pulsed ion beam, the ions of which are disposed along the pulse direction, separated with respect to their ion masses, having a first detector for analysis of the first pulsed ion beam, said mass spectrometer comprising:

a) at least one beam switch which is disposed in the beam path of the first ion beam for deflecting ions of at least one specific mass or of at least one specific mass range from the first ion beam as a decoupled ion beam, and b) at least one device for reuniting at least one decoupled ion beam with the first ion beam in order to form a common ion beam, the ions of the decoupled ion beam and of the first ion beam being positioned in the common ion beam, separated with respect to their masses, and at least one device for the attenuation of the first ion beam or of the decoupled ion beam, which is disposed in the beam path of the first ion beam or of the decoupled ion beam between the beam switch which decouples the decoupled ion beam and the reuniting device.

26. The time-of-flight mass spectrometer according to claim 25, wherein at least one of the devices for the attenuation of the ion beam is a filter.

27. The time-of-flight mass spectrometer according to claim 26, further comprising at least one control device for controlling at least one of the beam switches as a function of the intensity of the first ion beam or of the decoupled ion beam, which intensity is detected by the first detector or by the further detector.

28. The time-of-flight mass spectrometer according to claim 25, further comprising at least one control device for controlling at least one of the beam switches as a function of the intensity of the first ion beam or of the decoupled ion beam, which intensity is detected by the first detector or by the further detector.

29. The time-of-flight mass spectrometer according to claim 25, wherein the ions of the decoupled ion beam and of the first ion beam, which are positioned in the common ion beam, are separated in accordance with their respective mass.

* * * * *